United States Patent [19]

Kostuck

[11] Patent Number: 4,946,253

[45] Date of Patent: Aug. 7, 1990

[54] RECONFIGURABLE SUBSTRATE-MODE HOLOGRAPHIC INTERCONNECT APPARATUS AND METHOD

[75] Inventor: Raymond K. Kostuck, Tucson, Ariz.

[73] Assignee: Arizona Board of Regents For and On Behalf of the University of Arizona, Tucson, Ariz.

[21] Appl. No.: 422,097

[22] Filed: Oct. 16, 1989

[51] Int. Cl.⁵ .............................................. G02B 27/10
[52] U.S. Cl. ...................................... 350/169; 350/3.7; 350/3.72; 350/96.19
[58] Field of Search ...................... 350/3.7, 3.71, 3.72, 350/3.73, 96.15, 96.19, 169

[56] References Cited

U.S. PATENT DOCUMENTS

| | | | |
|---|---|---|---|
| 3,622,220 | 11/1971 | Kogelnick | 350/3.7 |
| 3,885,856 | 5/1975 | Ostrowsky et al. | 350/3.7 |
| 4,671,603 | 6/1987 | McQuaid et al. | 350/3.7 |
| 4,765,715 | 8/1988 | Matsudaira et al. | 350/171 |

Primary Examiner—Eugene R. LaRoche
Assistant Examiner—Jay Ryan
Attorney, Agent, or Firm—Victor Flores

[57] ABSTRACT

The present invention discloses a reconfigurable optical interconnect apparatus that redirects an optical beam through embedded holographic elements of a substrate-mode hologram to connecting information processors or to photonic switching devices. The apparatus includes a substrate-mode hologram, including a polarization insensitive input hologram member, one or more embedded polarization sensitive hologram members that couple transmitted diffracted or non-diffracted light to respective optical receivers. The optical receivers further couple the light out of the substrate-mode hologram or to cascaded similar apparatus. The method includes processing an incident beam of polarized light through a controlled polarization modulator, through an optical information encoder, such as a spatial light modulator, then further processing the polarized light through the substrate-mode hologram. The apparatus has advantages of being compact and expandable into larger systems.

16 Claims, 2 Drawing Sheets

RECONFIGURABLE SUBSTRATE-MODE HOLOGRAPHIC INTERCONNECT APPARATUS AND METHOD

FIELD OF THE INVENTION

This invention relates to reconfigurable optical interconnect apparatus and method. More particularly, the present invention relates to reconfigurable optical interconnect apparatus utilizing holographic elements in a dielectric substrate for redirecting an optical beam and to methods for processing a polarized light beam using opto-electronics components, interconnection masking and holographic elements.

DESCRIPTION OF THE PRIOR ART

A distinct advantage of optical interconnects over electrical counterparts is the potential for reconfiguring the interconnect pattern between processing elements. Previous methods suggested for reconfigurable holographic optical interconnects employed multiple gratings recorded in photorefractive crystals, as discussed by P. Yeh, et al. in an article entitled "Optical interconnects using photorefractive dynamic holograms", Applied Optics. Vol 27, No. 11, pgs.2093-2095 (June 1988) or in liquid crystal shutters with a set of fixed holograms as discussed by J. B McManus. et al. in an article entitled "Switched holograms for reconfigurable optical interconnections: demonstration of a prototype device", Applied Optics. Vol 27, No. 20, pgs.4244-4250 (October 1988). Polarization based optical systems have also been suggested for use as reconfigurable interconnect networks, see generally K. M. Johnson, et al. in an article entitled "Optical interconnection network using ferroelectric liquid crystal gates", Applied Optics. Vol 27, No. 9, pgs.1727-1733 (May 1988). An important feature of free-space imaging type systems is that information can be transferred in parallel from one plane to another. However, the components used in these implementations are difficult to keep aligned, relatively large, expensive, and not readily expandable.

One method suggested to reduce alignment problems is to use a total internally reflected beam within a dielectric substrate in conjunction with holographic elements as input/output couplers. The optical receivers can be attached to the substrate to form a rigid package, see generally an article entitled "Fabrication of diffractive-reflective optical interconnects for infrared operation based on total internal reflection", by F. Sauer, Applied Optics. Vol 28, No. 2, pgs.386-388 (January 1989), or a paper presented by T. Jannson, et al. entitled "Highly-Parallel Holographic Integrated Planar Interconnections" at an Optical Society of America (OSA) meeting at Lake Tahoe, Nev. in June 1988. This arrangement has the advantage of transferring a two dimensional pattern or image over relatively large distances between receivers, especially by the serial alignment of many multiple single substrates as suggested by J. Jahns et al. in an article entitled "Planar integration of free-space optical components", Applied Optics. Vol 28, No. 9, pgs.1602-1605 (May 1989). However, the applicant does not know of any prior art apparatus that can guide an optical beam within a dielectric substrate-mode holographic interconnect structure and also redirect an optical beam within the same structure prior to coupling the optical beam to an output receiver. Nor does the applicant know of any prior art that teaches cascading a plurality of unitary layered dielectric substrate-mode holographic interconnects that redirect the optical beam prior to coupling the beam to the output receivers on each respective interconnect of the cascade group.

Therefore, a need is believed to exist for a reconfigurable optical interconnect apparatus that guides and redirects an optical beam through a unitary layered substrate-mode hologram prior to coupling to output receivers. A need is also seen to exist for a cascaded plurality of reconfigurable optical interconnect apparatus that guides and redirects an optical beam through a unitary layered substrate-mode hologram prior to coupling to output receivers.

SUMMARY OF THE INVENTION

Accordingly, the primary object of the present invention is to solve these deficiencies by providing a substrate-mode holographic interconnect adapted to not only guide a optical beam within the structure, but also to redirect the optical beam within the same structure.

Another object of the present invention is to provide a cascaded apparatus comprising of a plurality of substrate-mode holographic interconnects adapted in accordance with the primary object.

It is another object of this invention to provide a method of processing an incident beam of polarized light through a controlled polarization modulator, through an optical information encoder, such as a spatial light modulator, then further processing the polarized light through the substrate-mode holographic interconnect in accordance with the primary object of the invention, then reconfiguring the interconnect pattern between processing elements.

The present invention satisfies the foregoing objectives by providing a reconfigurable substrate-mode holographic interconnect apparatus that comprises a composite dielectric substrate structure formed by first and second dielectric substrate layer members, said first substrate layer member having holographic input couplers on a surface and being insensitive to the polarization state of an illumination beam, said composite structure having a layer interface between said first and second substrate layers that is provided with an emulsion having an index of refraction to assure optical matching between substrate layers of an optical beam being reflected between opposed surfaces and through the medium comprising the composite substrate structure. The reflected optical beam is enabled by inputting said illumination beam into said composite dielectric substrate at a preselected diffraction angle determined by the diffraction properties of said holographic input couplers, said composite dielectric structure having total internal reflection dielectric property requirements that are satisfied by said preselected diffraction angle that enable opposed surfaces of said composite dielectric structure to reflectively guide said input illumination beam away from said holographic input couplers to maintain a polarized reflected optical beam. The composite structure is also provided with a plurality of polarization selective holographic receiver elements embedded along the layer interface that are used to selectively couple the reflected beam to a corresponding output receiver of a plurality of output receivers provided on said second dielectric substrate layer member. The corresponding output receiver is selected according to the polarity of the input optical beam, i.e., when p-polarized light is incident on the embedded polarization selective holographic receiver, the p-polarized light continues to propagate in the original direction to a corresponding output receiver, or when s-polarized is incident on the same embedded receivers, the s-polarized light is diffracted in a changed direction to another corresponding output receiver. The plurality of output receivers have a higher refractive index than the substrate and therefore can couple light out of the substrate. The above described composite substrate interconnect structure may be cascaded to produce an enhanced interconnect apparatus.

The apparatus as a composite interconnect structure or as a cascaded group of such structure may be used in a system in a method for reconfiguring a spatial pattern, wherein an electro-optic modulator receives and changes the state of polarization of an incident optical beam and then transmits the beam to an information coding device, such as a spatial light modulator, which provides a spatial pattern for illuminating the input couplers of a composite interconnect structure. The input couplers are hologram elements that are insensitive to polarity of the input illuminating pattern. Once the polarized beam containing the spatial pattern is diffracted into the composite interconnect structure, the optical and dielectric characteristics of the composite substrate interconnect structure enable the beam to be guided away, in a zig-zag manner, from the point of entry towards said polarization selective holograms embedded between said first and second dielectric substrate layers to be selectively transmitted to corresponding output receivers. The selectivity difference enables the optical beam to be redirected and reconfigure the interconnect pattern.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

DESCRIPTION OF THE PREFERRED EMBODIMENT

Figure 1A:
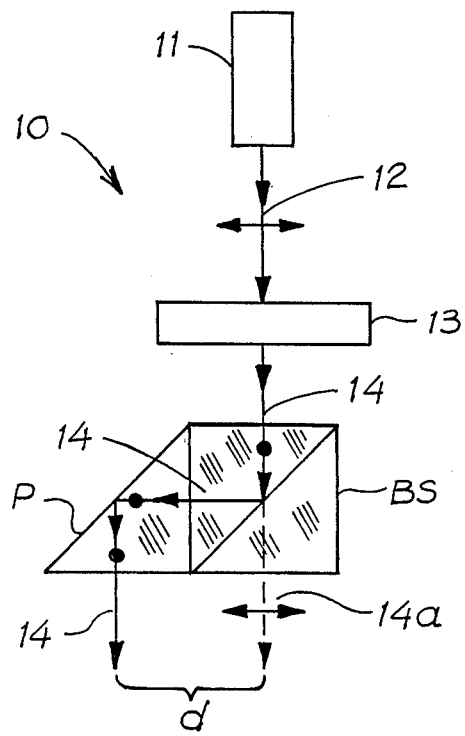
FIG. 1a shows an optical component arrangement for p-polarized, free-space, reconfigurable optical interconnect system, illustrating redirected delivery of an optical beam of opposite polarity.
Figure 1B:
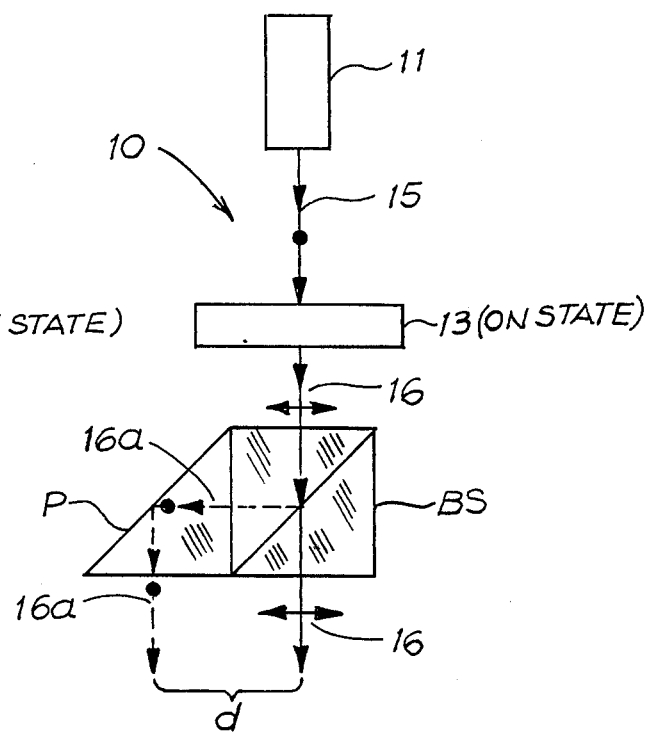
FIG. 1b shows an optical component arrangement for s-polarized, free-space, reconfigurable optical interconnect system, illustrating redirected delivery of an optical beam of opposite polarity.

Referring first to FIGS. 1a and 1b where free-space arrangement 10 of optical components for polarization based reconfigurable interconnect system are shown. In the arrangement of FIG. 1a, a p-polarized light 12 from a source 11, such as a semiconductor laser, illuminates a polarization modulator 13, which in the on-state will change the polarity of the incident beam to a s-polarity light 14. The s-polarity light 14 then passes to a polarizing beam splitter BS where it is reflected to a prism P where the s-polarized 14 is deflected and is spatially separated as indicated by the distance d had the light from source 11 been of s-polarity 14a. Similarly, FIG. 1b shows the case where source 11 delivers a s-polarized light 15 to polarization module 13, which then illuminates beam splitter BS with p-polarized light 16 which is transmitted directly through the beam splitter BS and is spatially separated as indicated by the distance d had the light from source 11 been of p-polarity 16a. While the arrangements shown in FIGS. 1a and 1b illustrate the important feature of free-space imaging type systems in that information can be transferred in parallel from one plane to another, the optical components used in these implementations are difficult to keep aligned, are costly, and not expandable.

Figure 2:
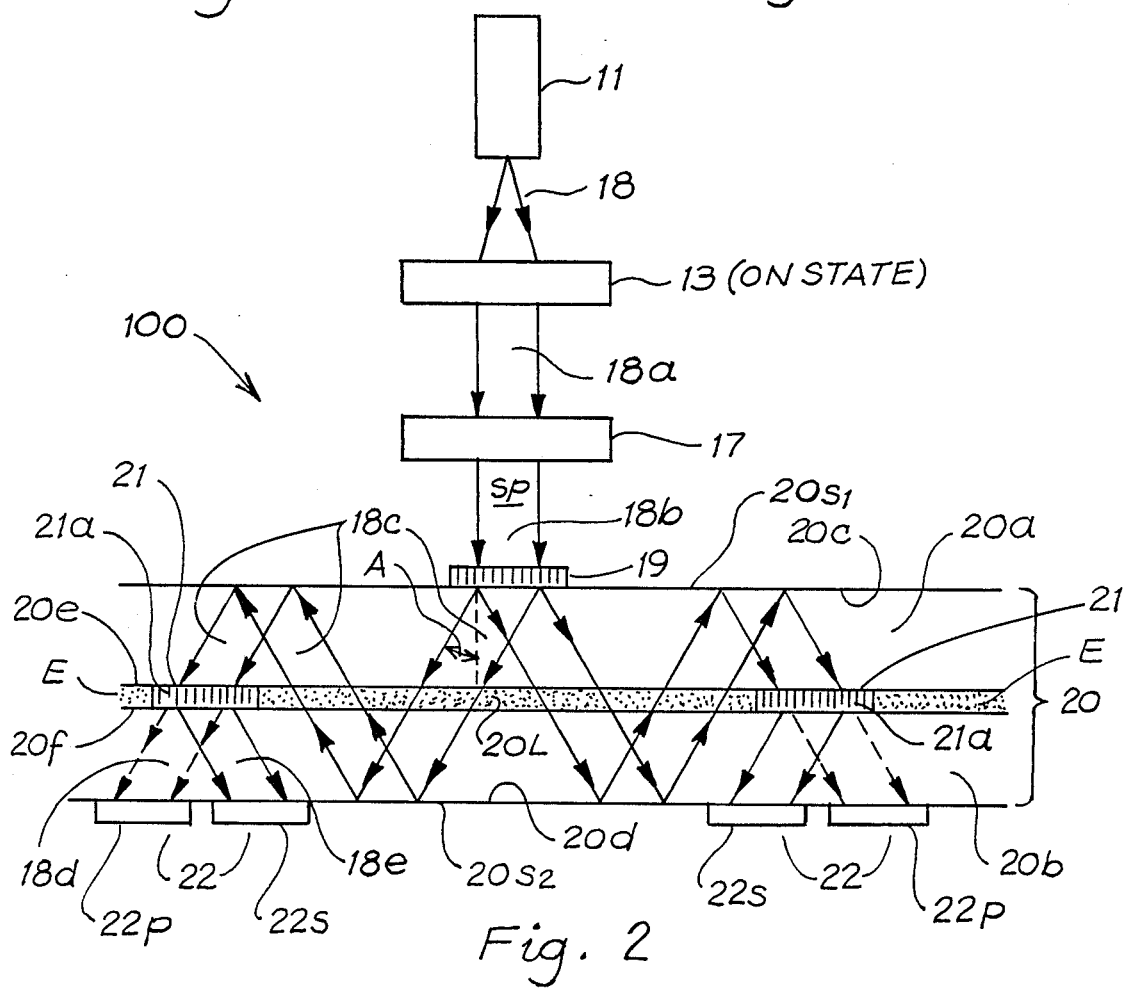
FIG. 2 is a composite substrate-mode holographic apparatus according to the present invention, illustrated in an optical system arrangement for reconfiguring a spatial pattern.

FIG. 2 shows an optical arrangement 100 wherein a composite dielectric substrate structure 20, having totally internally reflective dielectric properties, is utilized in conjunction with holographic elements to reconfigure a spatial pattern. The composite dielectric structure 20 comprises first and second dielectric substrate layer members 20a and 20b, respectively, said first substrate layer member 20a having holographic input couplers, generally shown as 19, attached to external surface 20s1 of substrate layer 20a. Holographic input couplers 19 being insensitive to the polarization state of an illumination beam 18b that can contain a spatial pattern sp to be reconfigured. Composite structure 20 has a layer interface 20L between said first and second substrate layers 20a and 20b, that is provided with an emulsion E having an index of refraction to assure optical matching to the dielectric substrate of the composite structure 20 according to a zig-zag path followed by reflected light beam 18c that begins at input coupler 19 and crosses surface 20e of the first dielectric layer 20a through emulsion E, into the second dielectric substrate layer 20b towards surface 20d, back to the first dielectric substrate layer 20a through emulsion E via surface 20f of the second dielectric substrate layer 20b to continue being reflected between opposed internal surfaces 20c and 20d within composite substrate structure 20. Composite structure is also provided with a plurality of polarization selective holographic receiver elements 21, having gratings 21a, that are embedded along layer interface 20L and that are used to selectively couple the reflected beam 18c to a corresponding output receiver of a plurality output receivers 22 provided on an external surface 20s2 of said second dielectric substrate layer member 20b. The corresponding output receiver 22 is selected according to the polarity of the input optical beam 18c, i.e., when beam 18c is p-polarized light that is incident on the embedded polarization selective holographic receiver 21, p-polarized light 18d continues to propagate in the original direction to a corresponding output receiver 22p, or when beam 18c is s-polarized and is incident on the same embedded receivers 21, s-polarized light 18e is diffracted in a changed direction to another corresponding output receiver 22s. The plurality of output receivers 22 have a higher refractive index than substrate 20b and therefore can couple light out of the composite dielectric substrate structure 20.

As also shown in FIG. 2, composite substrate structure 20 may have an application in reconfiguring a spatial pattern sp using the arrangement 100. In arrangement 100, an optical beam 18 from polarized light source 11 propagates through an electro-optic modulator 13 to produce an optical beam 18a of different polarity than beam 18, assuming that modulator 13 is in the on-state. Then, differently polarized beam 18a is passed through an information encoding device 17, such as a spatial light modulator, where an illuminating input beam 18b, having spatial pattern sp, is produced. Illuminating input beam 18b, which now has both the spatial and polarization information, illuminates input coupler 19 attached to the composite dielectric substrate. Input couplers 19 are holograms that are constructed with equal coupling coefficients for the two orthogonal polarization states selected by electro-optic modulator 13 and are thus insensitive to the polarity of the incident input beam 18b. Input couplers 19 diffracts beam 18b at a diffraction angle A which exceeds the condition required for total internal reflection within the composite dielectric substrate structure 20 and facilitates internally reflected beam 18c. Once beam 18c is diffracted into the composite interconnect structure 20, the optical characteristics of the structure 20 enable beam 18c to be guided away in a zig-zag manner from the point of entry to said embedded polarization selective holographic receivers 21 to be selectively transmitted to corresponding output receivers 22 in accordance with the polarization modulation frequency of modulator 13. Reconfiguration of the interconnect pattern is accomplished by the polarization selectivity of the holographic receiver 21 at a speed determined by the electro-optic modulator.

Hologram elements 19 and 21 for this composite substrate structure 20 can be fabricated by optical means in materials such as dichromated gelatin, photopolymers, or silver-halide emulsions, or by computer generated, binary, and multi-phase step techniques. Output receivers 22 are silicon detectors.

The composite dielectric substrate structure 20 collectively comprises a substrate-mode holographic interconnect apparatus that can be extended by adding additional holographic elements 19 and 21 on the same substrate, or by cascading composite dielectric substrates 20 using techniques, such as by using etched grooves on respective interconnecting surfaces 20bs1 and 20bs2 of a first and second composite substrate structures 20 to be cascaded (not shown).

Experimental Verification

Figure 3:
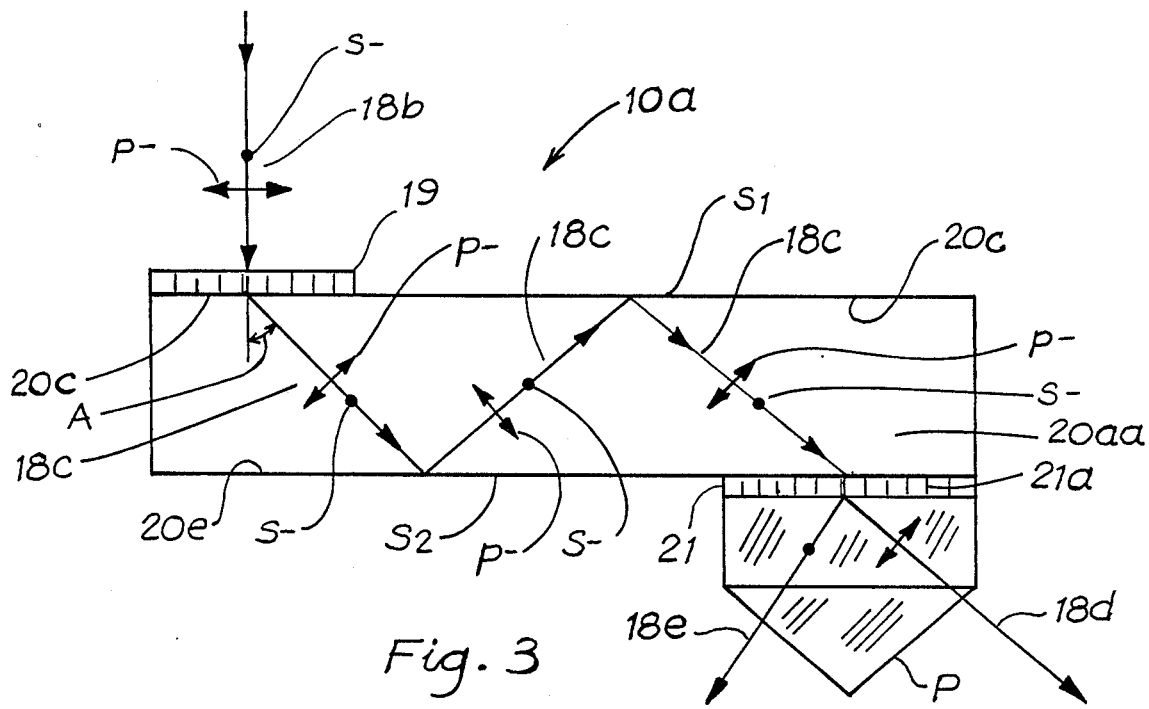
FIG. 3 is an experimental arrangement of the present invention with emphasis on using insensitive input hologram and polarization selective output hologram of the type that would be embedded between layered dielectric substrate members.
Figure 4:
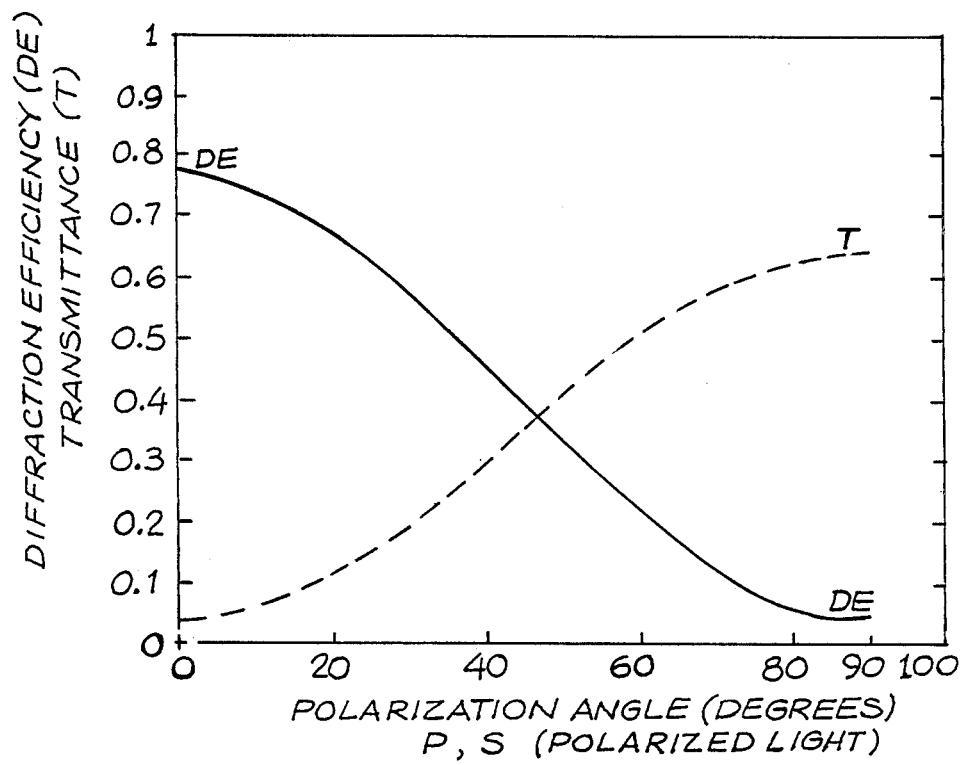
FIG. 4 Experimental results showing the intensities in each channel of the devices as a function of the incident polarization angle, i.e. s-polarized or p-polarized input optical beam.

FIG. 3 shows an arrangement 10a used to verify the polarization properties of substrate-mode holograms to redirect a polarized optical beam. As shown, the composite substrate structure 20 of FIG. 2 is approximated by modified first substrate layer 20aa which is provided with a polarization insensitive input coupler 19 on surface s1 and a polarization selective hologram receiver 21, having grating 21a, on surface s2. In operation, a beam 18b, which was modulated between p- and s- polarities, illuminates polarization insensitive input coupler 19, which produces a diffracted optical beam 18c, that is diffracted at an angle A that exceeds the total internal reflection condition for the dielectric substrate, and that is reflected between internal surfaces 20e and 20c until it reaches the polarization selective hologram 21. Depending upon the polarity of beam 18c, the output will either be directly transmitted as a p-polarized beam 18d or as a diffracted s-polarized beam 18e. Prism P is index matched to the substrate 20aa to allow beams 18d and 18e to propagate out of the substrate for measurement. FIG. 4 is graphical result illustrating diffraction efficiency DE and transmittance T plotted as a function of the polarization angle of illuminating beam 18b. As expected, when the polarization angle is at 0 degrees, i.e. beam 18b contains virtually all s-polarized light, the transmittance T is at its lowest, while when the polarization is at 90 degrees, the transmittance is at its highest. Similarly, when the polarization angle is at 0 degrees, i.e. beam 18b contains virtually all s-polarized light, the diffraction efficiency DE is at its highest, while when the polarization is at 90 degrees, i.e. beam 18b contains virtually all p-polarized light, the diffraction efficiency is at its lowest. The results demonstrate that a large difference in light intensity is possible using different polarization properties of substrate-mode holograms. This difference is suitable for thresholding receivers in an interconnect system.

Therefore, while the present invention has been shown and described herein in what is believed to be the most practical and preferred embodiments, it is recognized that departures can be made therefore within the scope of the invention, which is therefore not to be limited to the details disclosed therein but is to be accorded the full scope of the claims so as to embrace any and all equivalent apparatus.

I claim:

1. A reconfigurable substrate-mode holographic interconnect apparatus, said apparatus comprising:
   composite homogeneous dielectric substrate means for reconfiguring an optical beam;
   at least one input holographic means for coupling a polarized input optical beam into said composite dielectric substrate, said input holographic means being attached to a first exterior surface of said composite substrate means;
   at least one polarization selective holographic means embedded within said composite dielectric structure for receiving said polarized input optical beam, for selectively directing and producing a directed polarized optical beam; and
   a plurality of output receiver detector means attached to a second exterior surface of said composite dielectric structure for receiving and outputting said directed optical beam.

2. A reconfigurable substrate-mode holographic interconnect apparatus as recited in claim 1, wherein:
   said composite homogeneous dielectric substrate means is adapted for being cascaded to other similarly formed composite structures for enhancing reconfiguring performance over a single composite dielectric structure.

3. A reconfigurable substrate-mode holographic interconnect apparatus as recited in claim 1, wherein:
   said composite dielectric structure comprises a first dielectric substrate layer member and a second dielectric substrate layer member, said first and second members being disposed in an overlay relationship with one another.

4. A reconfigurable substrate-mode holographic interconnect apparatus as recited in claim 1, wherein:
   said composite dielectric structure comprises a first dielectric substrate layer member and a second dielectric substrate layer member, said first and second members being disposed in an overlay relationship with one another and having an interface means for attaching said first and second substrate layer members to each other, said interface means comprises having an emulsion means with a refractive index that matches refractive indices of said first and second substrate layer members to form a composite homogeneous dielectric substrate.

5. A reconfigurable substrate-mode holographic interconnect apparatus as recited in claim 4, wherein:
said at least one polarization selective holographic means comprises being embedded between said first and second substrate layer members along said interface means.

6. A reconfigurable substrate-mode holographic interconnect apparatus as recited in claim 1, wherein:
said at least one input holographic means comprises a polarity insensitive holographic element having a predetermined diffraction angle characteristic; and
said composite dielectric structure having a totally internally reflected dielectric property requirement that is satisfied by said diffraction angle that enables said coupled polarized input optical beam to be internally and reflectively guided away from said at least one input holographic means and thus produce said polarized reflected optical beam.

7. A reconfigurable substrate-mode holographic interconnect apparatus as recited in claim 1, wherein:
said plurality of output receiver detector means comprises having a higher refractive index than said composite dielectric substrate structure that enables said directed optical beam to be coupled out of said composite dielectric substrate structure.

8. A reconfigurable substrate-mode holographic interconnect apparatus as recited in claim 1, wherein:
said at least one input holographic means and said at least one polarization selective holographic means comprise being formed optically in photosensitive materials.

9. A reconfigurable substrate-mode holographic interconnect apparatus as recited in claim 1, wherein:
said at least one input holographic means and said at least one polarization selective holographic means comprise being formed lithographically using integrated circuit processing techniques.

10. A reconfigurable substrate-mode holographic interconnect apparatus, said apparatus comprising:
first dielectric substrate layer member;
second dielectric substrate layer member, said first and second dielectric substrate layer members being disposed in an overlay relationship with one another;
interface means for attaching said first and second substrate layer members to each other, said interface means having a refractive index that matches refractive indices of said first and second dielectric substrate layer members to form a composite homogeneous dielectric substrate;
first plurality of holographic means attached to said first dielectric substrate layer member for coupling a polarized input optical beam into said composite dielectric substrate at a preselected diffraction angle, said composite dielectric substrate structure having totally internal reflection dielectric property requirements that are satisfied by said diffraction angle to enable said composite dielectric structure to reflectively guide said input optical beam away from said first plurality of holographic means to produce a polarized reflected optical beam;
second plurality of holographic means for receiving said reflected optical beam and for selectively directing and producing a directed polarized optical beam, said directed polarized optical beam having a same polarity as said reflected optical beam, said second plurality of holographic means being embedded between said first and second dielectric substrate layer members along said interface means; and
a plurality of receiver detector means attached to said second substrate layer member for receiving and outputting said directed optical beam.

11. A reconfigurable substrate-mode holographic interconnect apparatus as recited in claim 10, wherein:
said first and second plurality of holographic means comprise being formed optically in photosensitive materials.

12. A reconfigurable substrate-mode holographic interconnect apparatus as recited in claim 10, wherein:
said first and second plurality of holographic means comprise being formed lithographically using integrated circuit processing techniques.

13. A method of optically reconfiguring a spatial pattern contained in an optical beam, said method comprising the steps of:
(a) providing a reconfigurable substrate-mode holographic interconnect apparatus, said apparatus comprising:
composite homogeneous dielectric substrate means for processing an optical beam,
at least one input holographic means for coupling a polarized input optical beam into said composite dielectric substrate, said input holographic means being attached to a first exterior surface of said composite substrate means,
at least one polarization selective holographic means embedded within said composite dielectric structure for receiving said polarized input optical beam, for selectively directing and producing a directed polarized optical beam, and
a plurality of output receiver detector means attached to a second exterior surface of said composite dielectric structure for receiving and outputting said directed optical beam;
(b) producing a controlled polarized input beam having a spatial pattern; and
(c) reconfiguring said produced polarized input beam within said provided reconfigurable substrate-mode holographic interconnect apparatus.

14. A method of optically reconfiguring a spatial pattern as recited in claim 13, wherein said step of producing said controlled polarized light beam includes:
(a) providing a laser for producing a polarized light beam;
(b) providing a controlled polarization modulator for changing the polarity of said polarized light beam;
(c) providing a spatial light modulator containing a spatial pattern for being processed; and
(d) arranging said provided laser to direct a light towards said polarization modulator and arranging the output beam of the polarization modulator to be directed towards said spatial light modulator, and arranging the spatial pattern output from said spatial light modulator to be directed towards said at least one input holographic means.

15. A method of optically reconfiguring a spatial pattern as recited in claim 13 wherein said step of reconfiguring said produced polarized input beam includes:
(a) diffracting said produce polarized input beam through said at least one input holographic means at a diffraction angle that satisfies a totally internal reflection dielectric property requirements of said composite dielectric substrate structure to enable said composite dielectric structure to reflectively guide said input optical beam away from said at least one input holographic means to produce a polarized reflected optical beam;

(b) reflecting said polarized reflected optical beam towards said at least one polarization selective holographic means;

(c) receiving said polarized reflected optical beam by said at least one polarization selective holographic means;

(d) selectively directing said received polarized reflected optical beam by said at least one polarization selective holographic means towards a one of said plurality of output receiver detector means;

(e) receiving and outputting said directed optical beam by a one of said plurality of output receiver detector means; and (f) modulating said polarization modulator for reconfiguring said spatial pattern.

16. A reconfigurable substrate-mode holographic interconnect apparatus, said apparatus comprising:

composite homogeneous dielectric substrate means for reconfiguring an optical beam;

at least one input holographic means for coupling a polarized input optical beam into said composite dielectric substrate, said input holographic means being disposed on said composite substrate means; and at least one polarization selective holographic means, also disposed on said composite dielectric structure, for receiving said polarized input optical beam, for selectively directing and producing a directed polarized output optical beam.

* * * * *